June 3, 1930. C. T. HIBBARD Re. 17,689
ELECTRICALLY OPERATED VALVE
Original Filed March 14, 1924
Fig. 1,
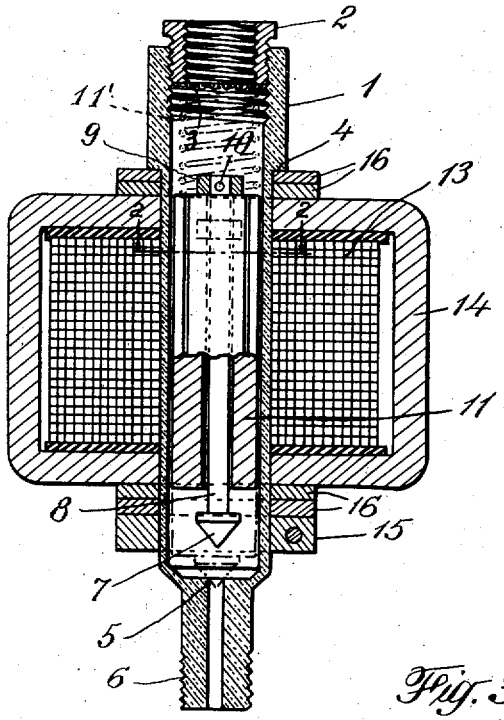
Fig. 2,
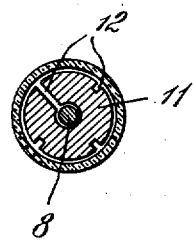
Fig. 3,
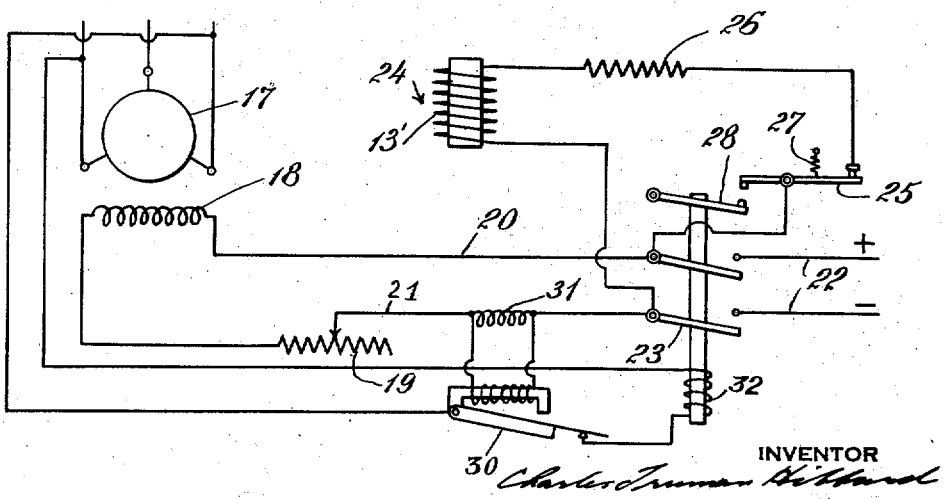
INVENTOR
Charles Truman Hibbard
BY
Pennie Davis Marvin & Edmonds
ATTORNEYS Reissued June 3, 1930 Re. 17,689

UNITED STATES PATENT OFFICE

CHARLES TRUMAN HIBBARD, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA

ELECTRICALLY-OPERATED VALVE

Original No. 1,640,324, dated August 23, 1927, Serial No. 699,171, filed March 14, 1924. Application for reissue filed June 27, 1929. Serial No. 374,252.

This invention relates to a device particularly adapted to be used as a means for actuating a compressor load releasing mechanism. To be more specific, this invention relates to an electrically operated valve, controlled by the electrical condition of a motor and adapted to supply fluid under pressure to a load releasing device such as those commonly used with compressors of various types. One form of such unloading device employs the admission of fluid under pressure to suitable cylinders usually furnished as a part of the compressors whereby the intake valves are held open by the pressure of the fluid from the receiving tank passing through the pilot valve to the load releasing cylinders. A particular object of the invention is to provide an electrically operated valve of simple construction and to provide an arrangement which makes this valve particularly useful in connection with compressors operated by synchronous motors.

My improved device includes a pipe connected to a pressure tank or reservoir, or any other suitable source of fluid under pressure; a valve in this pipe connection; and a solenoid encircling the pipe and adapted to operate the valve when the solenoid is energized. I prefer to connect the solenoid to a winding of an electric motor, which carries an induced current on starting; for example, the field winding of a synchronous motor. The improved valve mechanism is very simple in construction, due to the fact that the magnetic core which is connected to the valve is placed directly within the passage which conveys fluid under pressure. In other words, the magnetic core is adapted to permit the escape of the working fluid through or past the core. The solenoid is adjustably mounted on the outside of the pipe which contains the magnetic core and the valve associated therewith.

Where this invention is used with compressors operated by synchronous motors, I prefer to connect the solenoid to the field winding in such a manner that when the main field switch is open the solenoid is connected across the field winding, and when the field switch is closed, this connection is broken. In this manner the current induced in the field winding during the starting period supplies energy for operating the improved valve mechanism. This system has the distinct advantage of making it unnecessary to interrupt a circuit carrying considerable current. The circuit through the solenoid is of course closed before the motor is started and the value of the induced current, which operates the valve mechanism, is reduced to a low value when the field switch is closed and the solenoid circuit broken, as the motor is rotating at approximately normal speed at this point.

The present invention is particularly adapted to be used with automatic starting systems, such as those disclosed in my copending applications Serial No. 352,159, filed January 17, 1920, Serial No. 639,036, filed May 15, 1923 and Serial No. 726,928, filed July 19, 1924. Where a motor is equipped with such an automatic starting system and with the improved pilot valve mechanism which forms the subject matter of this application, the motor can be used to drive a compressor without requiring any attention whatever on the part of the operator. The load releasing mechanism usually provided with compressors is operated by the pilot valve mechanism so as to relieve the motor of its load until it has attained its synchronous speed. After the motor has attained its normal speed the load is automatically applied.

This invention may be best understood by considering the following detailed description and the accompanying drawings, in which Fig. 1 is a vertical section view of the improved pilot valve mechanism.

Fig. 2 is a transverse section view on line 2—2 of Fig. 1.

Fig. 3 is a diagrammatic view of a motor provided with the improved pilot valve mechanism.

The particular embodiment of the invention illustrated in the accompanying drawing includes a pipe 1, which serves as a fluid pressure chamber, adapted to be connected to a pressure tank. A suitable threaded connection 2 is provided for the purpose of connecting the pipe 1 to a pressure tank or storage vessel (not shown). The threaded connection 2 may be provided with a piece of screening 3, soldered thereto as shown in the drawing or otherwise attached thereto, for the purpose of preventing solid particles from entering the valve mechanism. The pipe 1 may consist of an ordinary piece of piping or it may be shaped as shown in the drawing with the particular object in view of forming a valve chamber. The upper part of this pipe may be provided with a shoulder as shown at 4, and the lower end may be shaped to form a valve seat 5. The pipe may be threaded as shown at 6 for the purpose of connecting it to load releasing device (not shown). A valve 7 is provided within the pipe 1, this valve having a stem 8 carrying a cap 9 at its upper end. This cap may be fixed to the stem by any suitable means such as the pin 10. A magnetic core 11 encircles the valve stem 8 and is loosely mounted thereon. I prefer to make the valve stem somewhat longer than the magnetic core, so that there will be some lost motion between these two parts. The core is adapted to alternately engage the cap 9 and the upper face of the valve 7. This core is loosely mounted within the pipe 1 and I prefer to provide the core with a number of longitudinally extending passages 12 (see Fig. 2).

The reason for providing these passages and for mounting the core loosely within the pipe 1 is to provide for the free passage of fluid through or past the core. It has been found that a more reliable and a more easily constructed electrically operated valve may be made by placing the magnetic core directly within the main fluid passage as shown in the accompanying drawing. This construction possesses the distinct advantage of making it unnecessary to provide a mechanical connection between a valve enclosed within a pressure chamber and a magnetic core disposed outside of this chamber. The improved construction reduces the number of moving parts, and therefore the improved device is more dependable than the electrically operated valves of other types heretofore used. The magnetic core and the valve may be made integral, but I prefer to construct these parts as shown in Fig. 1 so that the magnetic core can be brought into motion before the valve is actuated. This serves as an effective safeguard against the valve becoming lodged in either extreme position.

A solenoid 13 encircles the pipe 1 and is arranged so that when the solenoid is energized the magnetic core 11 is raised. This solenoid can be mounted on the pipe 1 in any suitable manner but I prefer to provide means whereby the position of this coil can be readily adjusted, so as to provide for the proper throw of the valve 7. The solenoid 13 may be enclosed within a casing 14, which may form a part of the magnetic circuit through the solenoid. A clamping ring 15 is provided for the purpose of fixing the casing 14 on the pipe 1; and spacing rings 16 are provided for the purpose of positioning the casing 14 properly on the pipe 1. By removing or adding spacing rings of different thicknesses, it is possible to fix the casing 14 to the pipe in any desired position.

I prefer to mount the pipe 1 and the parts associated therewith in a vertical position so that the valve 7 is closed by the action of gravity. That is, when the parts are in this position and the solenoid is deenergized, the valve 7 and its stem fall until the valve strikes the valve seat 5. The magnetic core 11 also falls and rests on the top of the valve so as to hold it more firmly in position. It will be noted that the pressure within the pipe 1 also tends to hold the valve 7 more firmly in is closed position. When the solenoid 13 is energized the magnetic core 11 rises until it strikes the cap 9 carried by the valve stem, and then the continued upward movement of the magnetic core lifts the valve from its seat and permits the fluid under pressure to escape to the load releasing device (not shown). It is of course obvious that the improved valve mechanism can be mounted in a position other than the vertical position if some means is provided for returning the valve 7 to its seat. For example, a coil spring as shown in dotted lines at 11′ in Fig. 1 could be used to supply the force which is supplied by gravity when the device is mounted in the vertical position.

In Fig. 3 I have illustrated in diagrammatic form the preferred embodiment of the invention as applied to a synchronous motor driving a compressor or other similar device. In Fig. 3 the motor stator is indicated at 17 and the field winding at 18. The compressor or other device driven by the motor is not shown. A field rheostat is shown at 19, and the main field switch at 23. The direct current supply leads are shown at 22. The improved pilot valve mechanism is illustrated diagrammatically at 24, the solenoid 13′ of this mechanism being connected across the field leads 20 and 21 through a contact switch 25. A resistance 26 is included in this short circuit connection in accordance with usual practice. The switch 25 is normally held closed by a spring 27 and the field switch 23 carries an arm 28 arranged so that when the field switch is opened the switch 25 is permitted to close under the action of the spring 27. When the field switch is closed the arm 28 opens the switch 25.

With the apparatus arranged as shown in Fig. 3, it will be noted that during the starting period the solenoid 13′ and the resistance 26 are connected across the field winding of the motor so that the current induced in this winding passes through the solenoid and causes the pilot valve to open in the manner above described. When the motor has attained a speed approximately equal to synchronous speed, the field switch is closed and the switch 25 is opened. When the field switch is closed the induced voltage in the field winding is practically zero, and therefore the opening of switch 25 does not interrupt the flow of any appreciable current. The field switch 23 may be closed manually or this switch may be closed automatically in a manner similar to that illustrated in the copending applications above referred to. The connections for such an automatic switch installation are shown in Fig. 3 wherein a frequency relay 30 is connected in the field circuit in parallel with a coil 31. The relay contact controls the circuit of an actuating coil 32 for the switch 23. While the motor is coming up to speed the relay is drawn up and the circuit of the coil 32 is open. Then when the motor has attained substantially synchronous speed, the relay drops back and closes the circuit of the coil 32, thereby actuating the switch 23 to connect the field winding of the motor to the line and disconnect the valve 24 and discharge resistance 26 from the field. In either case, however, the operation of the pilot valve mechanism 24 is exactly the same.

My improved valve mechanism can be manufactured at low cost, for the valve parts are few in number and easy to make. The valve mechanism can be used for many purposes and will require practically no attention after it has been installed. It is particularly useful in connection with synchronous motors used for driving compressors or pumps, for this device makes it possible to bring the motor up to speed before the load is applied thereto, this result being effected without any attention on the part of the operator.

The various details of my invention may be modified without departing from the principle of the invention, which is not limited to the particular embodiment illustrated and described, but includes such modifications thereof as fall within the scope of the appended claims. For example, the improved valve mechanism can be used with various types of motors. In some cases it may be desirable to energize the valve solenoid by means of constant potential current either direct or alternating, the current being applied when the motor is started and the circuit being broken when the motor reaches a certain condition such as a predetermined speed or the condition existing when the starting current falls to a predetermined value.

I claim:—

1. A device of the type described, comprising the combination of an electric motor, a valve for controlling the load on the motor, and means responsive to an electric current induced in the field winding of the motor for actuating said valve.

2. A device of the type described, comprising the combination of an electric motor, a valve for controlling the load on the motor, and means including a solenoid in series with the field winding of the motor for actuating said valve, said means being operated by the current induced in the motor field winding when the motor is started.

3. A device of the type described comprising the combination of an electric motor, a valve for controlling the load on the motor, a field switch, and means responsive to the current induced in the field winding of the motor for actuating said valve, said means being adapted to be connected in circuit with said field winding when said field switch is opened.

4. A device of the type described, comprising the combination of an electric motor, a valve for controlling the load on the motor, means including a solenoid in series with the field winding of the motor for actuating said valve, and means for opening the circuit thru said solenoid when the excitation current is supplied to the field winding.

5. A device of the type described, comprising the combination of an electric motor, a valve for controlling the load on the motor, means including a solenoid in series with the field winding of the motor for actuating said valve, and means for automatically opening the circuit through said solenoid when the excitation current is supplied to the field winding.

6. A device of the type described comprising the combination of an electric motor, a valve for controlling the load on the motor, a field switch, means including a solenoid, for operating said valve, and means associated with said field switch for connecting said solenoid across the field winding of the motor when the switch is opened and for breaking this connection when the said switch is closed.

7. A device of the type described comprising the combination of an electric motor having a field winding, a pipe adapted to receive fluid under pressure, a solenoid encircling said pipe, a valve within said pipe, adapted to be actuated by energizing said solenoid to control the load on the motor, and an electrical connection between said solenoid and said field winding whereby the operation of said valve is controlled by the current induced in said field winding.

8. A device of the type described comprising the combination of an electric motor having a field winding, a pipe adapted to receive fluid under pressure, a solenoid encircling said pipe, a valve within said pipe adapted to be energized by said solenoid to control the load on the motor, a magnetic core associated with said valve and movable thereon and adapted to permit the escape of fluid through said core, and an electrical connection between said solenoid and said field winding whereby the operation of said valve is responsive to the current induced in the field winding of the motor.

9. A device of the type described comprising the combination of an electric motor having a field winding, a pipe adapted to receive fluid under pressure, a solenoid encircling said pipe, a valve within said pipe and adapted to be actuated by energizing said solenoid to control the load on the motor, a stem carried by said valve, a magnetic core within said pipe and encircling said stem, said core having longitudinal passages therethrough to permit fluid to escape past said core, and an electrical connection between said solenoid and said field winding, whereby the operation of said valve is responsive to the current induced in the field winding of the motor.

10. A device of the type described comprising the combination of an electric motor having a field winding, a valve for controlling the load on the motor, means responsive to the current induced in the field winding of the motor for actuating said valve, means for connecting said first named means in circuit with said field winding when the motor is started, and means for disconnecting said first named means from the circuit of said field winding when the voltage induced in said field winding falls to substantially zero.

11. A device of the type described comprising the combination of an electric motor having a field winding, a field switch, a pipe adapted to receive fluid under pressure, a solenoid encircling said pipe, a valve within said pipe for controlling the load on the motor, a stem carried by said valve, a magnetic core within said pipe and encircling said stem, said core having longitudinal passages therethrough to permit fluid to escape past said core, and a connection between said solenoid and said field winding adapted to be established when said field switch is opened, whereby the operation of said valve is responsive to the current induced in the field winding of the motor.

12. A device of the type described comprising the combination of an electric motor having a field winding, a field switch, a pipe adapted to receive fluid under pressure, a solenoid encircling said pipe and adapted to be connected in the circuit of said field winding, a valve within said pipe adapted to be actuated by energizing said solenoid to control the load on the motor, said valve having a magnetic core movable thereon, and means for connecting said solenoid in the circuit of said field winding when said field switch is opened.

13. A device of the type described comprising the combination of an electric motor having a field winding, a pipe adapted to receive fluid under pressure, a solenoid encircling said pipe and adapted to be energized by the current induced in said field winding, a valve within said pipe adapted to be actuated by energizing said solenoid to control the load on the motor, said valve having a magnetic core movable thereon, means for connecting said solenoid in the circuit of said field winding when the motor is started, and means for disconnecting said solenoid from said field winding when the voltage induced in said field winding falls to substantially zero.

14. A device of the type described comprising the combination of an electric motor having a field winding, a pipe adapted to receive fluid under pressure, a solenoid encircling said pipe and adapted to be energized by the current induced in said field winding, a valve within said pipe for controlling the load on the motor, a stem carried by said valve, a magnetic core within said pipe and encircling said stem, said core having longitudinal passages therethrough to permit fluid to escape past said core, means for connecting said solenoid in series with said field winding when the motor is started, and means for opening the circuit through said solenoid when excitation current is applied to said field winding.

15. A device of the type described comprising the combination of an electric motor having a field winding, an electromagnetic valve for controlling the load on the motor adapted to be connected in series with said field winding, said electromagnetic valve being responsive to the current induced in said field winding, means for connecting said valve in series with said field winding during starting, and means for disconnecting said valve from said field winding when the motor reaches substantially normal speed.

16. A device of the type described comprising the combination of an electric motor, a valve for controlling the load on the motor, a switch, means controlled by said switch for actuating said valve, and means responsive to an electric current induced in the field winding of the motor for actuating said switch.

17. A device of the type described comprising the combination of a synchronous motor having a field winding, a resistance, a switch for connecting said resistance to said field winding, a valve for controlling the load on the motor, and means electrically connected to said resistance and responsive to current induced in the field winding and flowing through said resistance for actuating said valve.

18. A magnetically controlled valve comprising in combination, a casing, an electromagnetic coil therein, a pressure tight tube within said coil, a fluid conduit directly connected to the interior of said tube in fluid-tight relation thereto, a magnetic core within said tube, a valve stem loosely mounted in said core, and a valve carried by said stem and adapted to open and close said fluid conduit, said core and valve being forced in one direction when said coil is energized, and said core being arranged to rest directly on said valve when said coil is deenergized.

19. A device of the type described comprising the combination of a synchronous motor having a field winding, a source of excitation current for the field winding, a switch for connecting said source to said field winding, a valve for controlling the load on the motor, and means responsive to the closing of said switch for controlling said valve whereby the load is applied to the motor.

20. A device of the type described comprising the combination of a synchronous motor having a field winding, a source of excitation current for the field winding, a switch for connecting said source to said field winding, a valve for controlling the load on the motor, and unitary means for controlling both the field switch to supply field excitation and the valve to apply the load to the motor.

In testimony whereof I affix my signature.

CHARLES TRUMAN HIBBARD.